United States Patent
Kitsunezuka

(10) Patent No.: US 11,408,964 B2
(45) Date of Patent: Aug. 9, 2022

(54) LOCATION ESTIMATING APPARATUS, LOCATION ESTIMATING METHOD AND PROGRAM STORING RECORDING MEDIUM, AND LOCATION ESTIMATING SYSTEM

(71) Applicant: NEC Corporation, Tokyo (JP)

(72) Inventor: Masaki Kitsunezuka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 50 days.

(21) Appl. No.: 16/764,687

(22) PCT Filed: Nov. 21, 2018

(86) PCT No.: PCT/JP2018/042931
§ 371 (c)(1),
(2) Date: May 15, 2020

(87) PCT Pub. No.: WO2019/107237
PCT Pub. Date: Jun. 6, 2019

(65) Prior Publication Data
US 2021/0341564 A1 Nov. 4, 2021

(30) Foreign Application Priority Data

Nov. 30, 2017 (JP) .............................. JP2017-230799

(51) Int. Cl.
*G01S 5/02* (2010.01)
(52) U.S. Cl.
CPC .......... *G01S 5/0268* (2013.01); *G01S 5/0278* (2013.01); *G01S 5/0284* (2013.01)

(58) Field of Classification Search
CPC .... G01S 5/0268; G01S 5/0278; G01S 5/0274; G01S 5/0284
(Continued)

(56) References Cited

U.S. PATENT DOCUMENTS 10,726,642 B1 * 7/2020 Goluguri ............... G07C 5/0866
11,037,066 B2 * 6/2021 Hara ..................... G06N 7/005
(Continued)

FOREIGN PATENT DOCUMENTS

CN 104168650 A * 11/2014 ........... H04W 4/021
EP 2551696 A2 1/2013
(Continued)

OTHER PUBLICATIONS

Japanese Office Action for JP Application No. 2019-557179 dated Dec. 1, 2020 with English Translation.
(Continued)

*Primary Examiner* — Matthew C Sams

(57) ABSTRACT

The present invention can improve the precision of location estimation of a signal transmitting source. This location estimating apparatus is provided with: a data acquisition unit for acquiring measurement values of sensors which measure radio waves of a signal transmitting source and location information on the sensors; a class classification unit for class-classifying the acquired measurement values by using relative locations and the dissimilarity of the measurement values of each set of the sensors; and a location estimation unit for estimating the location of the signal transmitting source on the basis of the classified measurement values and the location information of the sensors.

20 Claims, 14 Drawing Sheets

(58) Field of Classification Search
USPC ............... 455/456.1, 456.5, 456.4, 550.1
See application file for complete search history.

(56) References Cited

U.S. PATENT DOCUMENTS

| | | | |
|---|---|---|---|
| 2003/0151398 A1* | 8/2003 | Murphy | G01R 29/0842 324/72 |
| 2007/0042706 A1* | 2/2007 | Ledeczi | G01S 5/0289 455/3.01 |
| 2013/0027251 A1 | 1/2013 | Lu et al. | |
| 2013/0065615 A1 | 3/2013 | Jeong et al. | |
| 2015/0074497 A1 | 3/2015 | Heurguier | |
| 2017/0113686 A1* | 4/2017 | Horita | B60W 30/09 |
| 2017/0190048 A1* | 7/2017 | Vice | B25J 5/007 |
| 2018/0239032 A1* | 8/2018 | Thiel | G01S 19/48 |
| 2020/0096598 A1* | 3/2020 | Jadav | G01S 5/14 |
| 2021/0129832 A1* | 5/2021 | Sakano | G08G 1/0962 |
| 2021/0206391 A1* | 7/2021 | Sakano | B60W 60/0027 |

FOREIGN PATENT DOCUMENTS

| | | |
|---|---|---|
| JP | 2001-333445 A | 11/2001 |
| JP | 2005-164248 A | 6/2005 |
| JP | 2006-220487 A | 8/2006 |
| JP | 2010-066235 A | 3/2010 |
| JP | 2013-205398 A | 10/2013 |
| JP | 2014-016291 A | 1/2014 |
| JP | 2014-235102 A | 12/2014 |

OTHER PUBLICATIONS

International Search Report corresponding to PCT/JP2018/042931 dated Jan. 29, 2019 (2 pages).
Written Opinion corresponding to PCT/JP2018/042931 dated Jan. 29, 2019 (10 pages).

* cited by examiner

| SENSOR ID | MEASUREMENT VALUE | CLASS |
|---|---|---|
| i | Zi | LINE-OF-SIGHT |
| j | Zj | NONE-LINE-OF-SIGHT |

| SENSOR ID | MEASUREMENT VALUE | DISTANCE TO $Z_i$ | DISTANCE TO $Z_j$ | CLASS |
|---|---|---|---|---|
| 1 | $Z_1$ | $D_{1i}$ | $D_{1j}$ | LINE-OF-SIGHT |
| 2 | $Z_2$ | $D_{2i}$ | $D_{2j}$ | NONE-LINE-OF-SIGHT |
| ... | ... | ... | ... | ... |
| i | $Z_i$ | $D_{ii}=0$ | $D_{ij}$ | LINE-OF-SIGHT |
| ... | ... | ... | ... | ... |
| j | $Z_j$ | $D_{ji}$ | $D_{jj}=0$ | NONE-LINE-OF-SIGHT |
| ... | ... | ... | ... | ... |
| k | $Z_k$ | $D_{ki}$ | $D_{kj}$ | LINE-OF-SIGHT |
| ... | ... | ... | ... | ... |
| N | $Z_N$ | $D_{Ni}$ | $D_{Nj}$ | LINE-OF-SIGHT |

LOCATION ESTIMATING APPARATUS, LOCATION ESTIMATING METHOD AND PROGRAM STORING RECORDING MEDIUM, AND LOCATION ESTIMATING SYSTEM

CROSS REFERENCE TO RELATED APPLICATIONS

This application is a national stage application of International Application No. PCT/JP2018/042931 entitled "Location Estimating Apparatus, Location Estimating Method and Program Storing Recording Medium, and Location Estimating System" filed on Nov. 21, 2018, which claims priority to Japanese Patent Application No. JP2017-230799 filed on Nov. 30, 2017, the disclosures of which are hereby incorporated by reference in their entirety.

TECHNICAL FIELD

The present invention relates to a location estimating apparatus and the like that estimate a location of a transmission source of a radio wave.

BACKGROUND ART

There has been known a technique in which a radio wave from a transmission source is received by a plurality of sensors, a propagation distance of the radio wave is estimated through use of received power of each sensor, and a location of the transmission source is estimated. PTLs 1 to 4 disclose a technique for improving estimation accuracy of the location of the transmission source.

PTL 1 discloses a location estimating method of acquiring a propagation distance by extracting a direct wave through use of a correlation between a received signal of a sensor and a known reference signal.

PTL 2 discloses a location estimating method in which radio waves are transmitted at various places in advance and correction parameters for distances are set by comparing estimation locations with correct locations.

PTLs 3 and 4 disclose a location estimating method in which a replica is derived from a radio wave propagation simulation performed based on map information such as building information and a cross-correlation of a received signal of a sensor and a replica for each location candidate of a transmission source are compared.

CITATION LIST

Patent Literature

[PTL 1] Japanese Unexamined Patent Application Publication No. 2010-066235
[PTL 2] Japanese Unexamined Patent Application Publication No. 2005-164248
[PTL 3] Japanese Unexamined Patent Application Publication No. 2013-205398
[PTL 4] Japanese Unexamined Patent Application Publication No. 2014-016291

SUMMARY OF INVENTION

Technical Problem

The location estimating method of a transmission source through use of a known reference signal being described in PTL 1 cannot improve estimation accuracy of a location of the transmission source when the reference signal is not included in a radio wave from the transmission source or an unknown reference signal is included.

In a case of the location estimating method of approximating an attenuation amount of a radio wave with respect to a propagation distance with a uniform propagation model being described in PTL 2, existence of obstacles makes radio wave propagation between a transmission source and a sensor nonuniform and complex. Thus, the approximated uniform propagation model is largely deviated from actual propagation, and hence estimation accuracy of a location of the transmission source cannot be improved.

With the location estimating method described in PTLs 3 and 4, a radio wave propagation test is conducted in advance in consideration of influence of attenuation and reflection of a radio wave, or a computer simulation is conducted in advance through use of detailed map data relating to landforms, buildings, or vegetation. Thus, an enormous amount of advance preparation is required, and estimation accuracy of a location of the transmission source cannot be improved without spending time and cost.

An object of the present invention is to solve the above-mentioned problems and to provide a location estimating apparatus and the like capable of improving estimation accuracy of a location of a transmission source.

Solution to Problem

A location estimating apparatus according to one aspect of the present invention includes a data acquisition unit configured to acquire measurement values of sensors that measure a radio wave from a transmission source, and location information of the sensors, a class classification unit configured to classify the acquired measurement values into classes through use of a relative location and a degree of dissimilarity between the measurement values for each pair of the sensors, and a location estimation unit configured to estimate a location of the transmission source, based on the classified measurement values and the location information of the sensors.

A location estimating method according to one aspect of the present invention includes, by a location estimating apparatus, acquiring measurement values of sensors that measure a radio wave from a transmission source, and location information of the sensors, classifying the acquired measurement values into classes through use of a relative location and a degree of dissimilarity between the measurement values for each pair of the sensors, and estimating a location of the transmission source, based on the classified measurement values and the location information of the sensors.

A program stored in a recording medium according to one aspect of the present invention causes a computer to execute, by a location estimating apparatus, acquiring measurement values of sensors that measure a radio wave from a transmission source and location information of the sensors, classifying the acquired measurement values into classes through use of a relative location and a degree of dissimilarity between the measurement values for each pair of the sensors, and estimating a location of the transmission source, based on the classified measurement values and the location information of the sensors.

A location estimating system according to one aspect of the present invention includes a plurality of sensors configured to measure a radio wave from a transmission source and the location estimating apparatus described above.

Advantageous Effects of Invention

The present invention is able to improve estimation accuracy of a location of the transmission source.

BRIEF DESCRIPTION OF DRAWINGS

FIG. 10 is a table in which acquired measurement data are classified into a line-of-sight class and a none-line-of-sight class.

EXAMPLE EMBODIMENT

With reference to the drawings, a location estimating apparatus and a location estimating system according to a first example embodiment are described.

First Example Embodiment (Description of Configuration)

Figure 1:
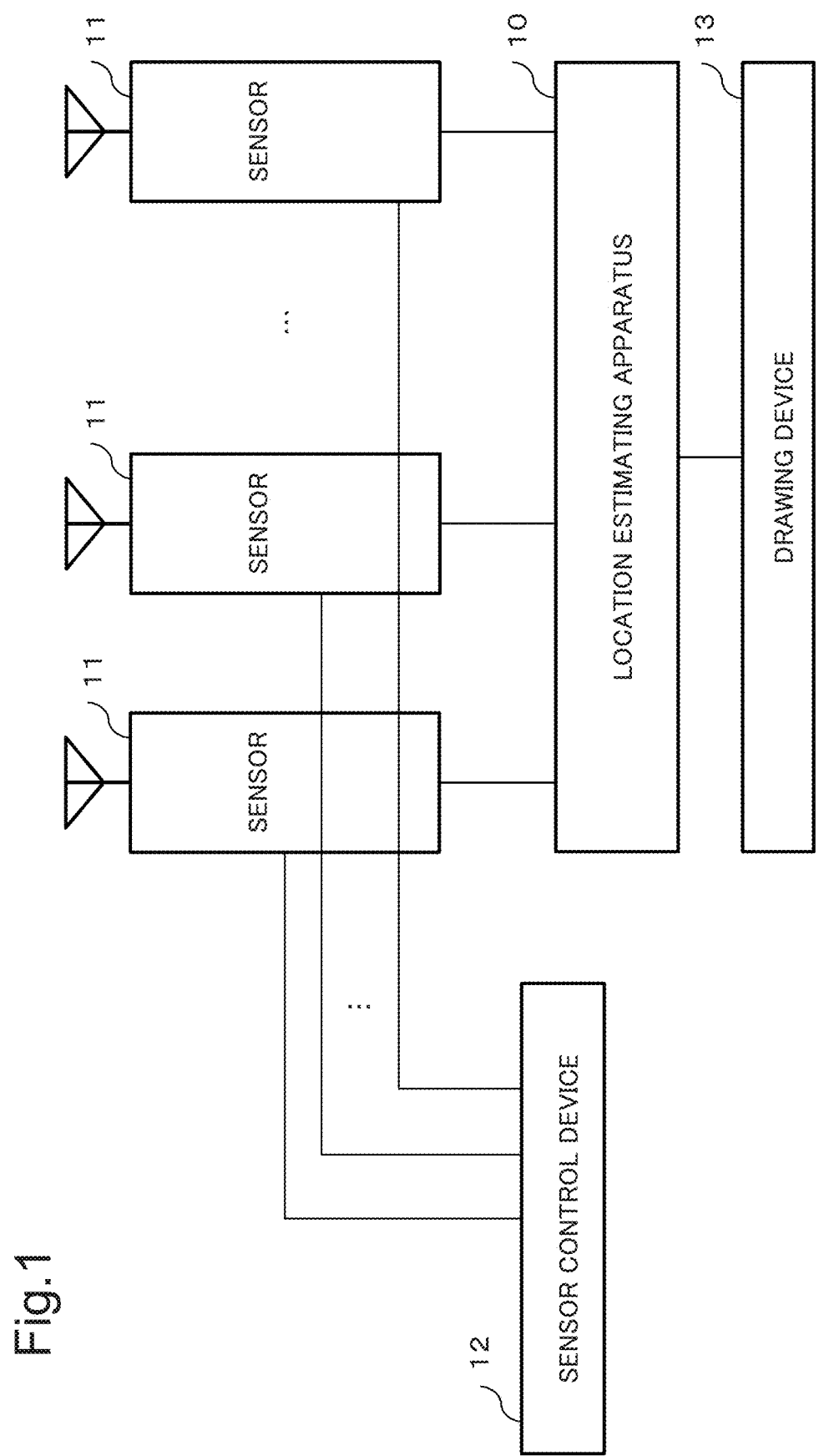
FIG. 1 is a block diagram illustrating a configuration of a location estimating system according to a first example embodiment.

FIG. 1 is a block diagram illustrating a configuration of the location estimating system according to the first example embodiment. The location estimating system illustrated in FIG. 1 includes a location estimating apparatus 10, a plurality of sensors 11, a sensor control device 12, and a drawing device 13.

The sensor 11 measures a radio wave from a transmission source. For example, the sensor 11 measures a radio wave at a specified frequency band, during a specified time period, and at a specified sensor setting. Further, the sensor 11 is capable of transferring measurement data including a measurement value of the radio wave and a sensor identifier to other devices. Note that, each of the sensors 11 may be denoted as a sensor 11 (#1), a sensor 11 (#i), or a sensor 11 (#N) for each identification.

The sensor control device 12 is a device that is capable of communicating with the sensor 11 and controls a measurement condition of the sensor 11. For example, the sensor control device 12 controls the sensor 11 in such a way as to measure the radio wave at the specified frequency band, during the specified time period, and at the specified sensor setting.

For example, the sensor setting includes gain of an amplifier included in the sensor 11, a sampling frequency of an analog/digital converter, a frequency resolution, and the number of times for averaging measurement values. Further, the sensor setting may include a setting of a statistic such as an average value, a variance value, a maximum value, and a minimum value of the measurement values to be output from the sensor 11. The sensor control device 12 may be provided inside the location estimating apparatus 10.

Note that, control by the sensor control device 12 is not essential for the location estimating system according to the first example embodiment. For example, when the sensor 11 measures a radio wave without changing a frequency, a time period or a sensor setting, control for the sensor 11 by the sensor control device 12 is not required.

The location estimating apparatus 10 acquires the measurement data of each of the sensors 11 and location information of each of the sensors 11, and estimates a location of the transmission source. The location estimating apparatus 10 is described later in detail.

The drawing device 13 draws and outputs the location of the transmission source estimated by the location estimating apparatus 10. Note that, the drawing device 13 is not an essential configuration for the location estimating system. The location of the transmission source estimated by the location estimating apparatus 10 may be output to other external devices.

Figure 2:
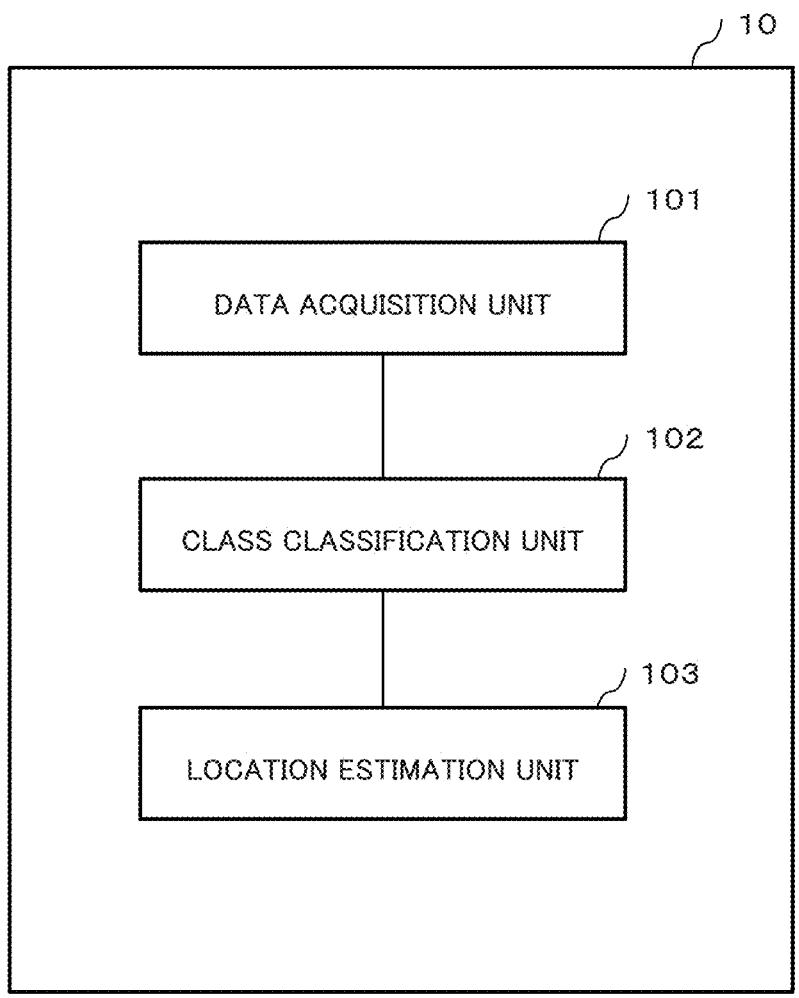
FIG. 2 is a block diagram illustrating a configuration of a location estimating apparatus according to the first example embodiment.

FIG. 2 is a block diagram illustrating a configuration of the location estimating apparatus according to the first example embodiment. The location estimating apparatus 10 includes a data acquisition unit 101, a class classification unit 102, and a location estimation unit 103.

The data acquisition unit 101 acquires the measurement data of the radio wave from the transmission source, which is received by each of the sensors 11. The measurement data includes the measurement value of the sensor 11 and the sensor identifier of the sensor 11. One example of the measurement value is received power of a radio wave. The measurement value may be acquired from each of the sensors 11, or may be acquired via a relay device (not illustrated) arranged between each of the sensors 11 and the location estimating apparatus 10.

The data acquisition unit 101 further acquires the sensor location information of each of the sensors 11. The sensor location information may be acquired from each of the sensors 11, or the sensor location information of each of the sensors 11 stored in a storage device (not illustrated) may be acquired. The sensor location information is location information indicating an installation location of the sensor, and is, for example, a location coordinate. A specific example of the location coordinate is a location coordinate (latitude/ longitude data) through use of a satellite positioning system. Note that, when the location estimating apparatus 10 is capable of holding the sensor location information, the data acquisition unit 101 is not required to acquire the sensor location information whenever the measurement data of the sensor 11 is acquired. When an installation location of at least one of the sensors 11 is changed, the data acquisition unit 101 acquires the sensor location information of the sensor 11.

The class classification unit 102 classifies the measurement values included in the measurement data of the sensor 11 into a plurality of classes. For example, the class classification unit 102 generates a feature vector having, as elements, a relative distance of each freely-selected sensor pair and a degree of dissimilarity between the measurement values of the sensors, and classifies the generated feature vector into the classes. Hereinafter, the pair of sensors is also referred to as a sensor pair. When the feature vectors are classified into the plurality of classes, the class classification unit 102 classifies the measurement values acquired by the data acquisition unit 101 into any of the plurality of classes. The class classification unit 102 is described later in detail.

Further, the relative distance between the sensors may be calculated through use of X coordinates and Y coordinates of the locations at which the sensors 11 are installed, and may further be calculated through use of Z coordinates (heights) of the installation locations of the sensors. The relative distance between the sensors may be calculated by the location estimating apparatus 10, or information of the relative distance between the sensors calculated relevant to the installation locations of the sensors in advance may be acquired from an external device.

The location estimation unit 103 generates a propagation model through use of the classified measurement value for each of the plurality of classes, and estimates the location of the transmission source through use of the generated propagation model.

Figure 3:
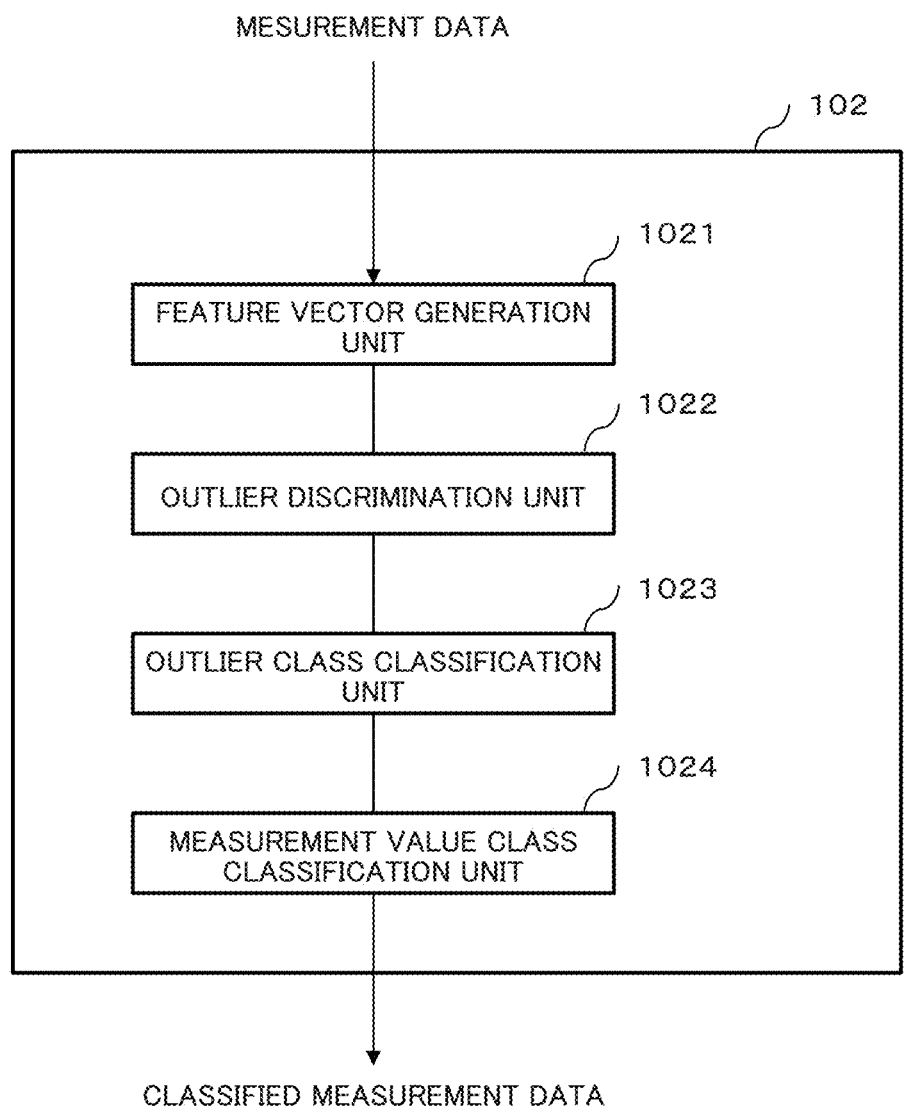
FIG. 3 is a block diagram illustrating a configuration of a class classification unit according to the first example embodiment.

FIG. 3 is a block diagram illustrating a configuration of the class classification unit according to the first example embodiment. The class classification unit 102 illustrated in FIG. 3 includes a feature vector generation unit 1021, an outlier discrimination unit 1022, an outlier class classification unit 1023, and a measurement value class classification unit 1024.

The feature vector generation unit 1021 generates the feature vector having, as elements, the relative distance between sensors and the degree of dissimilarity between the measurement values of the sensors.

The outlier discrimination unit 1022 discriminates presence or absence of an outlier of the feature vector generated for each freely-selected sensor pair.

The outlier class classification unit 1023 classifies measurement values that give outliers into the plurality of classes. For example, the plurality of classes include two classes being a line-of-sight class and a none-line-of-sight class.

With reference to the classified measurement values that give the outliers, the measurement value class classification unit 1024 classifies the measurement values acquired by the data acquisition unit 101 into any of the plurality of classes.

(Description of Operation)

With reference to the drawings, an operation of the location estimating system and the location estimating apparatus according to the first example embodiment is described. First, a positional relation among the sensors 11, the transmission source, and obstacles according to the first example embodiment is simply described.

Figure 4:
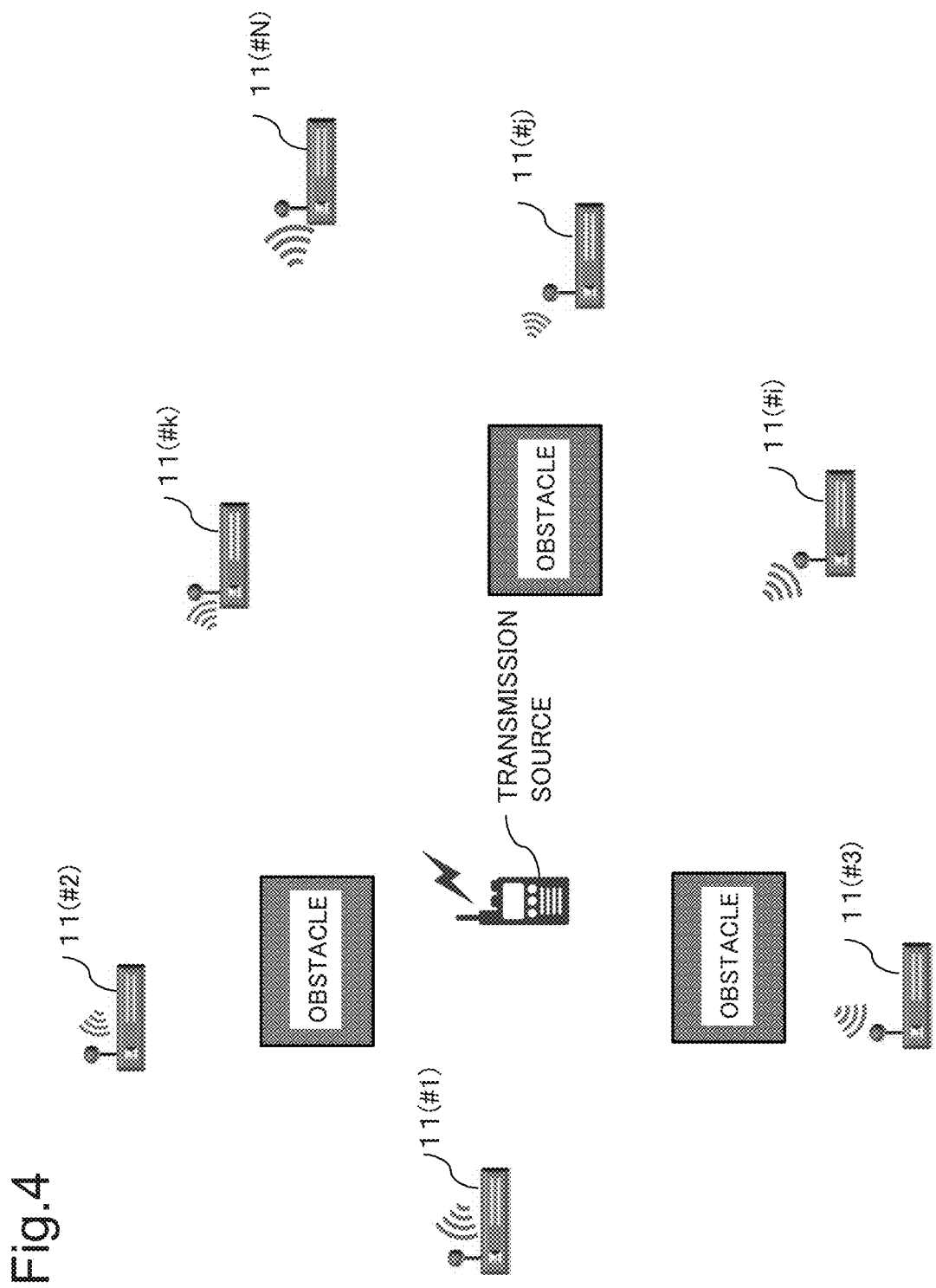
FIG. 4 is a schematic diagram illustrating a positional relation among a sensor, a transmission source, and an obstacle.

FIG. 4 is a schematic diagram illustrating the positional relation among the sensors, the transmission source, and the obstacles. According to FIG. 4, the sensors 11 (#1), (#2), . . . , (#i), (#j), (#k), . . . and (#N) (N is a natural number equal to or more than three) are arranged in a scattering manner. The transmission source is a device that transmits a radio wave at a certain frequency (or a frequency band). The obstacles are present between the transmission source and the sensors 11, and thus prevents the sensors 11 from receiving the radio wave from the transmission source. For example, the obstacles are constructions such as building, vegetation, or landforms. In the example of the positional relation illustrated in FIG. 4, due to the obstacles, the sensors 11 (#1) and the like that can receive the radio wave from the transmission source with a line-of-sight and the sensors 11 (#3) and the like that cannot receive the radio wave from the transmission source with a line-of-sight (hereinafter, described as none-line-of-sight) are present in a mixed manner.

Figure 5:
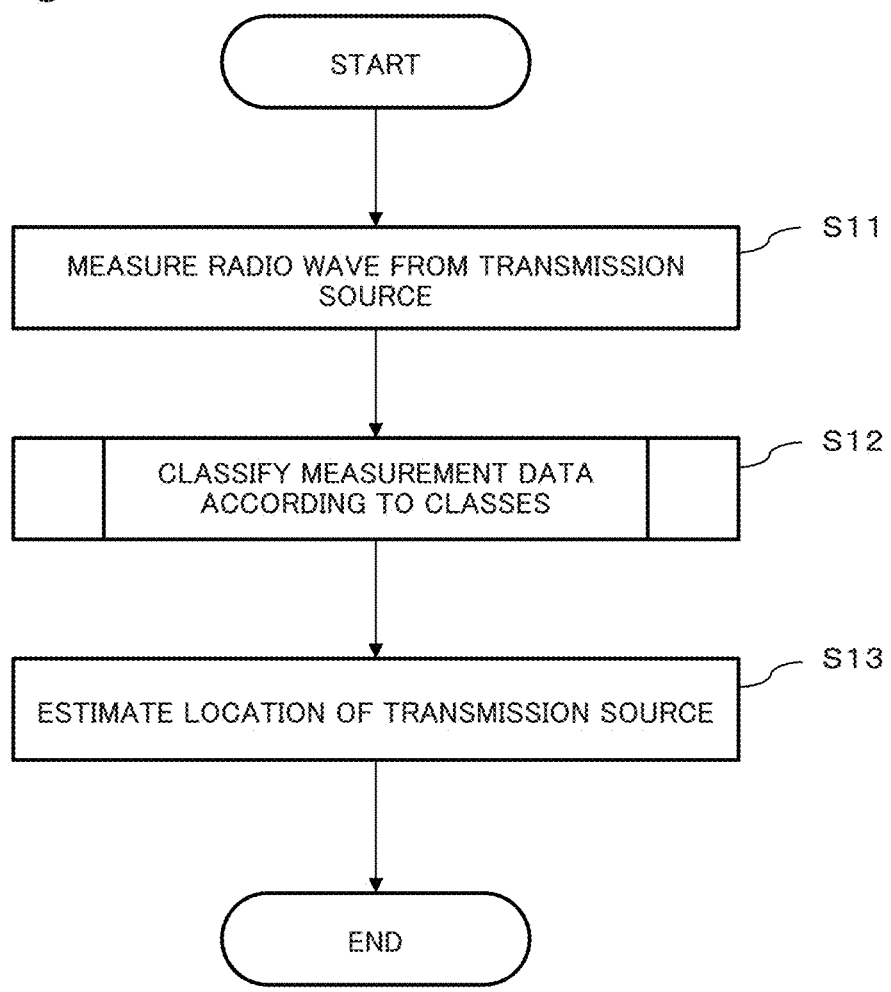
FIG. 5 is a flowchart illustrating an operation of the location estimating system according to the first example embodiment.

FIG. 5 is a flowchart illustrating an operation of the location estimating system according to the first example embodiment. The sensor control device 12 registers a frequency band, a time period, and a sensor setting for radio wave sensing to the sensor 11 in advance.

Each of the sensors 11 measures a radio wave from the transmission source at the registered frequency band, during the registered time period, and at the registered sensor setting (Step S11). The measurement value includes received power of the radio wave received at the installation location of each of the sensors 11. The measurement data including the measurement value and the sensor identifier are transmitted from each of the sensors 11 to the location estimating apparatus 10.

The data acquisition unit 101 of the location estimating apparatus 10 acquires the measurement data of the radio wave from the transmission source received by each of the sensors 11 and the sensor location information indicating the installation location of each of the sensors 11.

The class classification unit 102 of the location estimating apparatus 10 classifies the measurement data of each of the sensors 11 according to the classes (Step S12). For example, the classes into which the measurement data are classified are a line-of-sight class and a none-line-of-sight class. The line-of-sight class is a class in which a direct wave is dominant without an obstacle between the transmission source and the sensor 11. Further, the none-line-of-sight class is a class in which an indirect wave is dominant because of an obstacle between the transmission source and the sensor 11.

Figure 6:
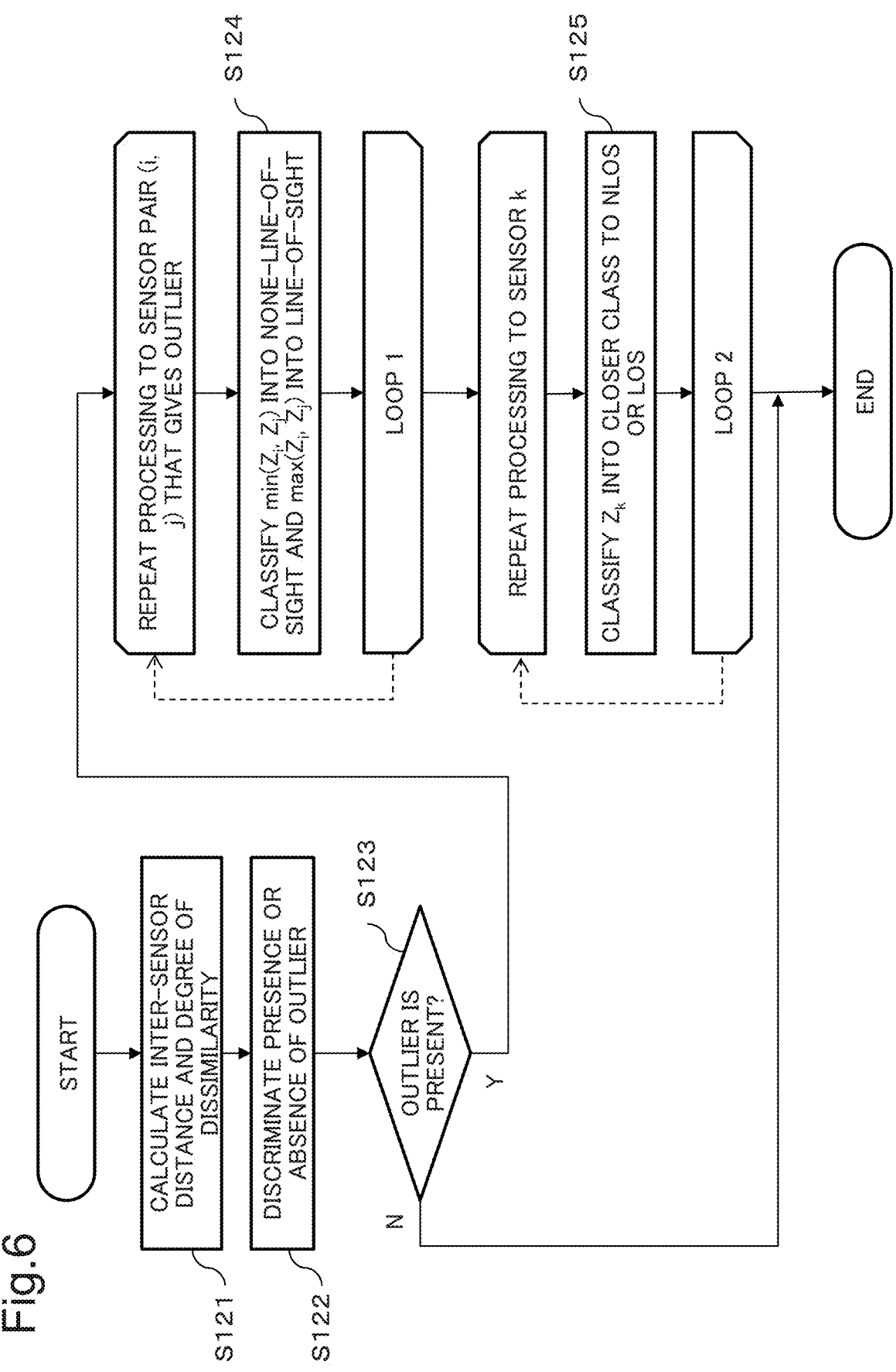
FIG. 6 is a flowchart illustrating one example of processing in Step S12.

FIG. 6 is a flowchart illustrating one example of processing in Step S12. The feature vector generation unit 1021 of the class classification unit 102 generates a feature vector having, as elements, a relative distance between a freely-selected sensor pair and a degree of dissimilarity between the measurement values of the sensor pair (Step S121). Specifically, with respect to the N sensors 11, the feature vector generation unit 1021 generates a feature vector having, as elements, a relative distance between a sensor pair including freely-selected two sensors (i, j) and a degree of dissimilarity $\gamma_{ij}$ between the measurement values of the sensor pair (i, j).

Herein, the degree of dissimilarity $\gamma_{ij}$ is expressed in Equation (1) given below through use of $Z_i$-$Z_j$ being a difference between the measurement values of the sensor pair (i, j).

$$\gamma_{ij} = (1/2) \times |Z_i - Z_j|^2 \quad (1)$$

Note that, 1≤i, j≤N is satisfied, and N is the number of sensors (a natural number of equal to or more than three).

When the number of sensors is N, the number of generated feature vectors is $_NC_2$ indicating two selected from N.

Note that, calculation of the degree of dissimilarity $\gamma_{ij}$ is performed through use of Equation (1), but is not limited thereto. More generally, Equation (2) using a freely-selected parameter a may be used.

$$\gamma_{ij}=(1/2)\times|Z_i-Z_j|^\alpha \quad (2)$$

In Equation (2), an expected value for the degree of dissimilarity is called a rodogram when $\alpha=0.5$ is satisfied, a madogram when $\alpha=1$ is satisfied, and a variogram when $\alpha=2$ is satisfied.

The outlier discrimination unit 1022 of the class classification unit 102 discriminates presence or absence of an outlier of the generated feature vector (Step S122).

Figure 7:
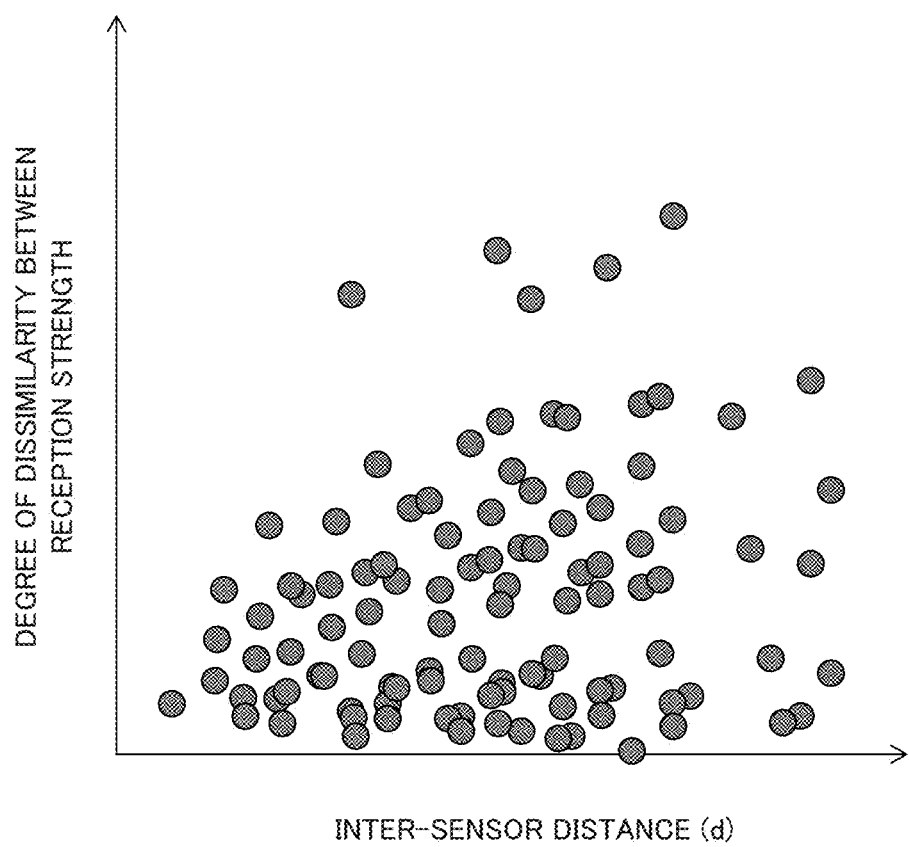
FIG. 7 is a distribution diagram illustrating a distribution of feature vectors.

FIG. 7 is a distribution diagram illustrating a distribution of feature vectors. In FIG. 7, a horizontal axis indicates an inter-sensor distance indicating a relative distance between a sensor pair, and a vertical axis indicates a degree of dissimilarity $\gamma_{ij}$ between reception strength of the sensor pair (i, j) that indicates a degree of dissimilarity between measurement values of the sensor pair.

For discrimination of an outlier, for example, there is used a test method of performing discrimination based on whether a test statistic, which is acquired by dividing deviation from an average of the measurement values by a standard deviation, is larger than a significant point. Other than this method, general outlier test methods such as Smirnoff-Grubbs' test and Thompson' test can be used for discrimination of the outlier.

Figures 8, 9:
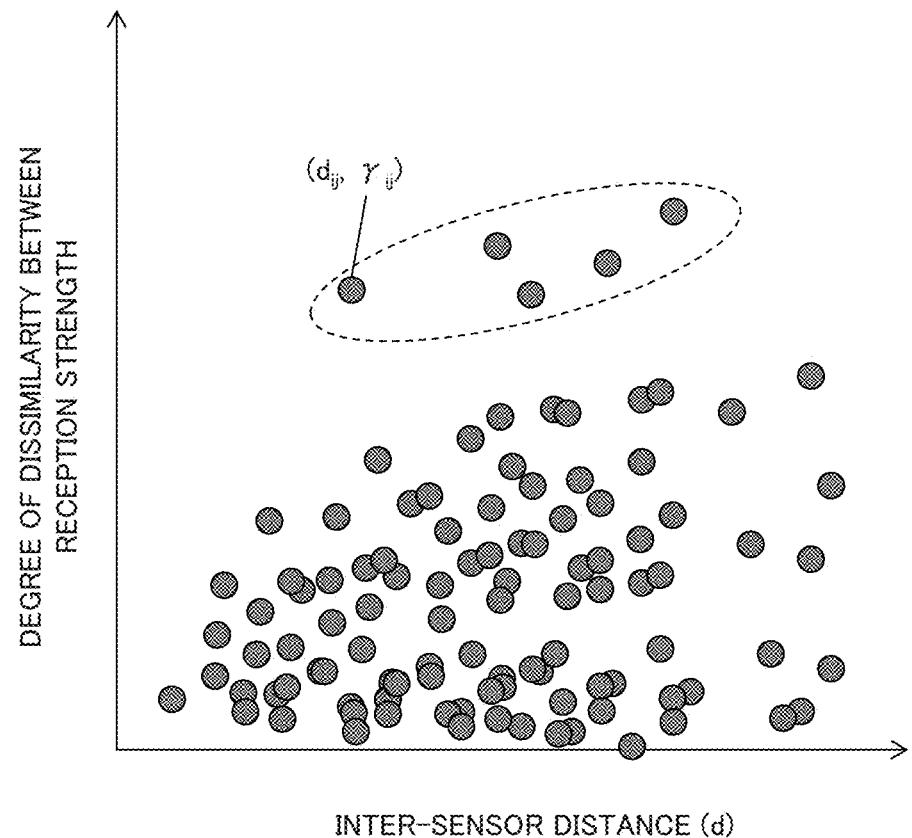
FIG. 8 is a diagram illustrating a result acquired by discriminating an outlier of the feature vector.
FIG. 9 is a table illustrating one example of class classification with respect to the outlier.

FIG. 8 is a diagram illustrating a result of discriminating the outlier of the feature vector. Herein, it is assumed that a relative distance between the sensor pair including freely-selected two sensors (i, j) is indicated with $d_{ij}$, and a degree of dissimilarity between the measurement values of the sensor pair is indicated with $\gamma_{ij}$.

When there is no outlier among the feature vectors (N in Step S123), the sensor 11 is at a location with a line-of-sight where there is no obstacle between the sensor 11 and the transmission source. Alternatively, the sensor 11 is at location with a none-line-of-sight where there is an obstacle between the sensor 11 and the transmission source. Such case can be approximated to a uniform propagation model, and processing of estimating the location of the transmission source in Step S13 illustrated in FIG. 5 is performed.

Meanwhile, when there is an outlier among the feature vectors, the outlier class classification unit 1023 subjects the sensor pair (i, j), which gives the degree of dissimilarity $\gamma_{id}$ being the outlier, to the following processing (loop 1).

The outlier class classification unit 1023 compares a measurement value $Z_i$ of the i-th sensor with a measurement value $Z_j$ of the j-th sensor, and performs class classification.

FIG. 9 is a table illustrating one example of class classification with respect to the outlier. Based on the comparison result, the outlier class classification unit 1023 classifies a smaller measurement value into a none-line-of-sight (NLOS) class, and a larger measurement value into a line-of-sight (LOS) class (Step S124).

In the above-mentioned example, classification is performed into the two classes including the none-line-of-sight class and the line-of-sight class, but the number of classes for classification may be equal to or more than three. For example, classification may be performed into three classes including the line-of-sight class in which a direct wave is dominant, an intermediate class in which a direct wave and an indirect wave arrive at the same degree, and the none-line-of-sight class in which an indirect wave is dominant.

Next, the measurement value of each of the sensors 11 is subjected to the following processing (loop 2). The measurement value class classification unit 1024 calculates to figure out whether a measurement value $Z_k$ of a k-th sensor (k=1, 2, . . . and N, and N is a natural number of equal to or more than three) is closer to a group of measurement values included in the none-line-of-sight class or a group of measurement values included in the line-of-sight class, and classifies the measurement value $Z_k$ into the closer group (Step S125). As a classification method, a general class classification method such as k-nearest neighbor algorithm or a support vector machine is used.

Note that, for calculation for figuring out proximity to the measurement values included in the none-line-of-sight class and the measurement values included in the line-of-sight class, a distance such as an Euclidean distance, a standard Euclidean distance, a Mahalanobis distance, a Manhattan distance, a Chebyshev distance, or a Minkowski distance, and a degree of similarity such as a cosine degree of similarity or Pearson's correlation function may be used.

FIG. 10 is a table in which the acquired measurement data are classified into the line-of-sight class and the none-line-of-sight class. In FIG. 10, for example, a distance to $Z_i$ indicates a distance between the measurement value $Z_i$ included in the line-of-sight class and the measurement value $Z_1$ of the sensor 11 (#1) associated with a sensor ID (=1), and has a value of Dn. Further, for example, a distance to $Z_j$ indicates a distance between the measurement value $Z_j$ included in the none-line-of-sight class and the measurement value $Z_1$ of the sensor 11 (#1) associated with the sensor ID (=1), and has a value of $D_{1j}$.

The measurement values $Z_1$ to $Z_N$ are classified into the line-of-sight class when the distance to $Z_i$<the distance to $Z_j$ is satisfied, and are classified into the none-line-of-sight class when the distance to $Z_i$>the distance to $Z_j$ is satisfied.

The location estimation unit 103 of the location estimating apparatus 10 generates a propagation model indicating a relationship between an estimated distance between the transmission source and the sensor and estimated reception strength (estimation measurement value) of the sensor, through use of the measurement data for each of the classification classes, and estimates the location of the transmission source through use of the propagation model (Step S13).

For example, two variables that are an expected value of received power to be measured when the distance between the transmission source and the sensor matches with a reference distance and a distance attenuation coefficient of received power with respect to the distance between the transmission source and the sensor can be used for expression.

Figure 11:
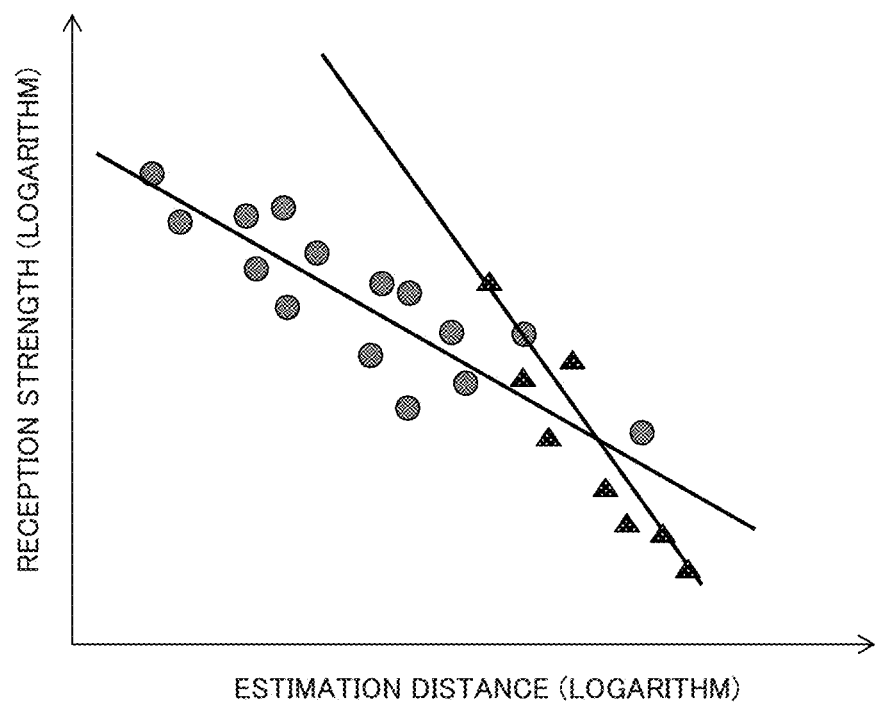
FIG. 11 is a diagram illustrating a propagation model generated for each class.

FIG. 11 is a diagram illustrating a propagation model that is generated for each class by the location estimation unit 103. Further, the location of the transmission source can be estimated through use of Equation (3) as a point at which likelihood of acquiring the actually-acquired measurement value is maximized when the transmission source is assumed to be present at the location.

$$\hat{z}_k=a_{Ck}\log_{10}|X_k-X|+b_{ck} \quad (3), \text{wherein}$$

$\hat{z}_k$: Estimated measurement value of k-th sensor;

$a_{Ck}$, $b_{Ck}$: Propagation coefficients in class Ck into which k-th sensor is classified;

$X_k$: Location coordinate of k-th sensor; and

X: Location coordinate of transmission resource.

The location estimation unit 103 calculates the likelihood of acquiring the estimated measurement value $\hat{z}_k$ at the sensor 11 (#k) by differentiating Equation (3), and determines X, ($a_{LOS}$, $b_{LOS}$), ($a_{NLOS}$, $b_{NLOS}$) with which the combination likelihood is maximized.

Note that, the example of acquiring x, ($a_{LOS}$, $b_{LOS}$), ($a_{NLOS}$, $b_{NLOS}$) with which the combination likelihood is maximized is described, but only a propagation model of one of the classes may be used. For example, when almost all the measurement values of the sensors 11 are included in the line-of-sight class, only the propagation model of the line-of-sight class is used for determining x and ($a_{LOS}$, $b_{LOS}$).

Description of Advantageous Effects

With the location estimating apparatus according to the first example embodiment, even when a radio wave from the transmission source is unknown, estimation accuracy of the location of the transmission source can be improved. The reason for this is because the location of the transmission source can be estimated through use of the location information of each of the sensors and the measurement value of the radio wave from the transmission source received by each of the sensors, without using a reference signal.

With the location estimating apparatus according to the first example embodiment, even when there is a part with ununiform radio wave propagation between the transmission source and the sensor due to an obstacle, estimation accuracy of the location of the transmission source can be improved. The reason for this is because a plurality of propagation models are generated according to positional relation between the transmission source and the sensors, and the location of the transmission source can be estimated for each of the generated propagation models.

For example, according to the first example embodiment, the measurement values of the sensors are classified into the classes depending on a propagation state, the propagation models are generated through use of the measurement values included in the classes, and the location of the transmission source is estimated. One example of the classes depending on the propagation state is the line-of-sight class and the none-line-of-sight class.

With the location estimating apparatus according to the first example embodiment, estimation accuracy of the location of the transmission source can be improved without conducting a radio wave propagation test in advance in consideration of presence of obstacles and conducting a computer simulation in advance. The reason for this is because the location of the transmission source can be estimated with the positional relation of each of the sensors and reception strength acquired by sensor measuring even when there is an obstacle between the transmission source and the sensors.

Second Example Embodiment

Next, with reference to the drawing, a second example embodiment is described. According to the first example embodiment, a feature vector having, as elements, a relative distance of each freely-selected sensor pair and a degree of dissimilarity between measurement values is generated. In contrast, according to the second example embodiment, a feature vector having, as elements, a relative direction and a degree of dissimilarity between measurement values is generated for each freely-selected sensor pair.

Figure 12:
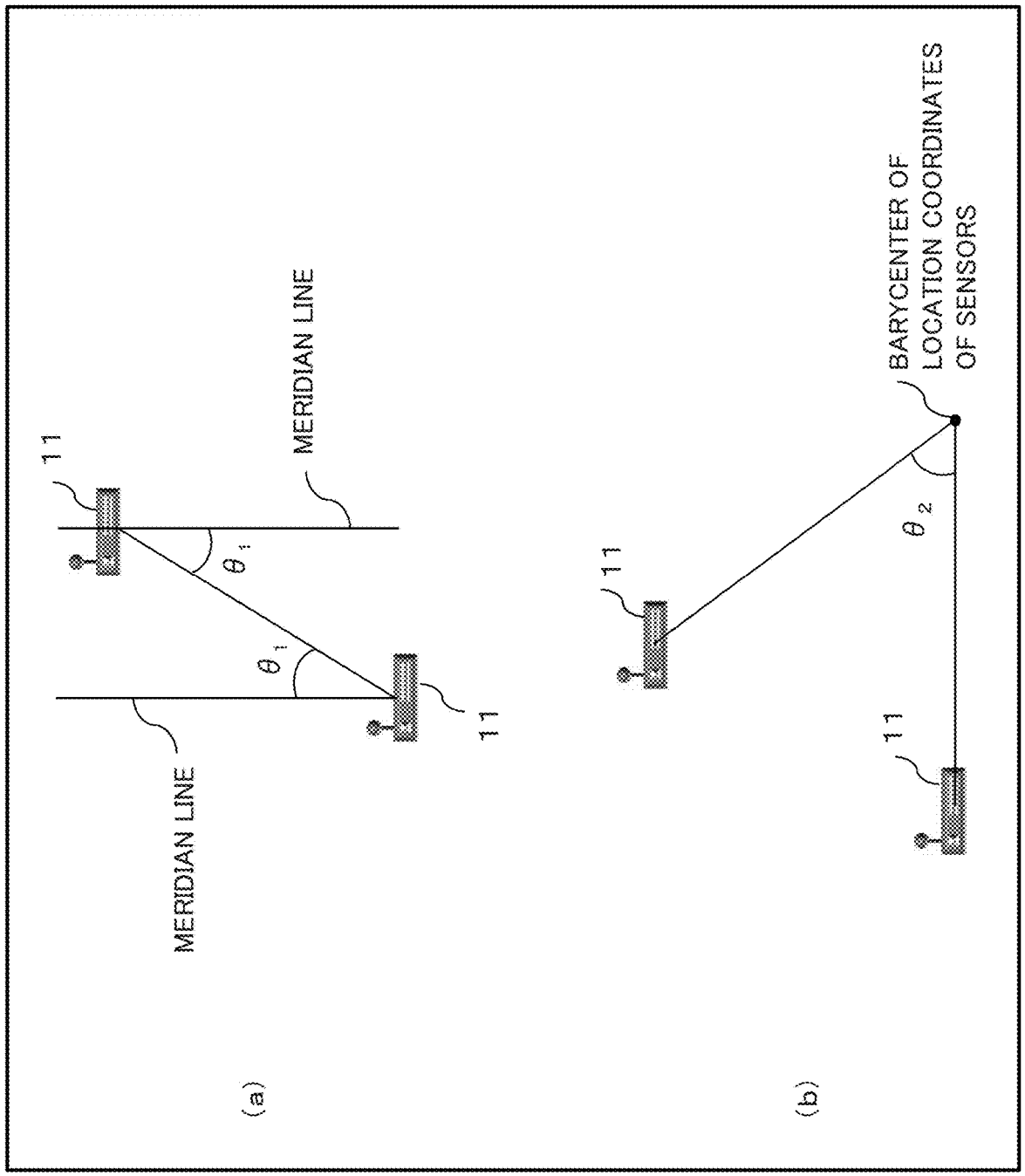
FIG. 12 is an explanatory diagram illustrating a relative direction of a sensor pair according to a second example embodiment.

FIG. 12 is an explanatory diagram illustrating a relative direction of a sensor pair according to the second example embodiment. As the relative direction of the sensor pair according to the second example embodiment, examples in (a) of FIG. 12 and (b) of FIG. 12 are described. The relative direction of the sensor pair illustrated in (a) of FIG. 12 is indicated with an angle (hereinafter, indicated as $\theta_1$) formed between a linear line connecting installation positions of the two sensors 11 and meridian lines (lines each connecting North Pole and South Pole). The linear line connecting the two sensors 11 is defined by location information of each of the sensors 11. Note that, the meridian line is also referred to as a longitudinal line.

The relative direction of the sensor pair illustrated in (b) of FIG. 12 is indicated with an angle (hereinafter, indicated as $\theta_2$) formed between two linear lines each connecting a barycentric coordinate of the sensors 11 and the location coordinate of each of the two sensors 11.

Note that, in (b) of FIG. 12, the example of the barycenter of the sensor 11 (#1) to the sensor 11 (#N) is described, but the barycenter is not the only example. As a reference point, a point may be freely selected on a plane including the installation locations of the sensors 11. For example, a certain point being a reference may be set to the installation location of the sensor (#3), and the angle may be an angle formed between two linear lines connecting the point and the two installation locations of the sensors 11.

In the following description of a configuration and an operation of the location estimating apparatus according to the second example embodiment, description for the matters similar to those according to the first example embodiment is omitted as appropriate, and a difference is described.

The location estimating apparatus 10 according to the second example embodiment has a configuration similar to that of the location estimating apparatus 10 according to the first example embodiment. However, according to the second example embodiment, elements of a feature vector to be generated by the feature vector generation unit 1021 of the location estimating apparatus 10 are different. For each sensor pair, the feature vector generation unit 1021 according to the second example embodiment generates a feature vector having, as elements, a sensor relative direction and a degree of dissimilarity between measurement values. Specifically, according to the second example embodiment, in FIG. 9 and FIG. 10 indicating distribution of the feature vectors according to the first example embodiment, the horizontal axis indicates a sensor relative direction ($\theta$) ($0 \le \theta < 180$) being a relative direction of the sensor pair in place of the inter-sensor direction (d) according to the first example embodiment.

Hereinafter, similarly to the first example embodiment, the outlier discrimination unit 1022 discriminates presence or absence of an outlier of the generated feature vector. The outlier class classification unit 1023 classifies the measurement values that give outliers into a plurality of classes. With reference to the measurement values that give the classified outliers, the measurement value class classification unit 1024 classifies the measurement values acquired by the data acquisition unit 101 into any of the plurality of classes. The location estimation unit 103 generates a propagation model for each of the plurality of classes through use of the classified measurement values, and estimates the location of the transmission source through use of the generated propagation model.

An operation of the location estimating apparatus 10 according to the second example embodiment is different from that of the location estimating apparatus 10 according to the first example embodiment in Step S121 in the processing of Step S12 (FIG. 6). Specifically, Step S121 according to the second example embodiment is different from Step S121 according to the first example embodiment in that a relative direction and a degree of dissimilarity are calculated for each sensor pair and that a feature vector having, as elements, the relative direction and the degree of dissimilarity is generated.

Hereinafter, similarly to the first example embodiment, the outlier discrimination unit 1022 of the class classification unit 102 discriminates presence or absence of an outlier of the generated feature vector (Step S122). Herein, it is assumed that the relative direction of a sensor pair (i, j) being the outlier is indicated with $\theta_{ij}$, and the degree of dissimilarity between the measurement values of the sensor pair is indicated with $\gamma_{ij}$.

When there is an outlier among the feature vectors, the outlier class classification unit 1023 subjects the sensor pair (i, j) that gives the degree of dissimilarity $\gamma_{ij}$ being the outlier to the processing of the loop 1, similarly to the first example embodiment. The outlier class classification unit 1023 compares the measurement value $Z_i$ of the i-th sensor with the measurement value $Z_j$ of the j-th sensor that give the outlier, and performs class classification.

Thereafter, with an operation similar to that of the location estimating apparatus 10 according to the first example embodiment, the location estimating apparatus 10 according to the second example embodiment can estimate the location of the transmission source.

The relative distance of each sensor pair and the degree of dissimilarity between the measurement values are the elements for generating the feature vector according to the first example embodiment, and the relative direction of each sensor pair and the degree of dissimilarity between the measurement values are the elements for generating the feature vector according to the second example embodiment, which are not the only examples. The feature vector generation unit 1021 may generate a feature vector having three elements including the relative distance, the relative direction and the degree of dissimilarity between the measurement values for each sensor pair.

Note that, the relative distance of the sensor pair or the relative direction of the sensor pair is also referred to as a relative location of the sensor pair.

Advantageous Effects of Advantageous Effects

Similarly to the location estimating apparatus according to the first example embodiment, the location estimating apparatus according to the second example embodiment can improve estimation accuracy of the location of the transmission source.

Third Example Embodiment

With reference to the drawing, a location estimating apparatus according to a third example embodiment is described. In the third example embodiment, in a class classification unit 102 of a location estimating apparatus 10, the feature vector generation unit 1021 according to the first example embodiment is replaced with a direction-based feature vector generation unit 2021.

Figure 13:
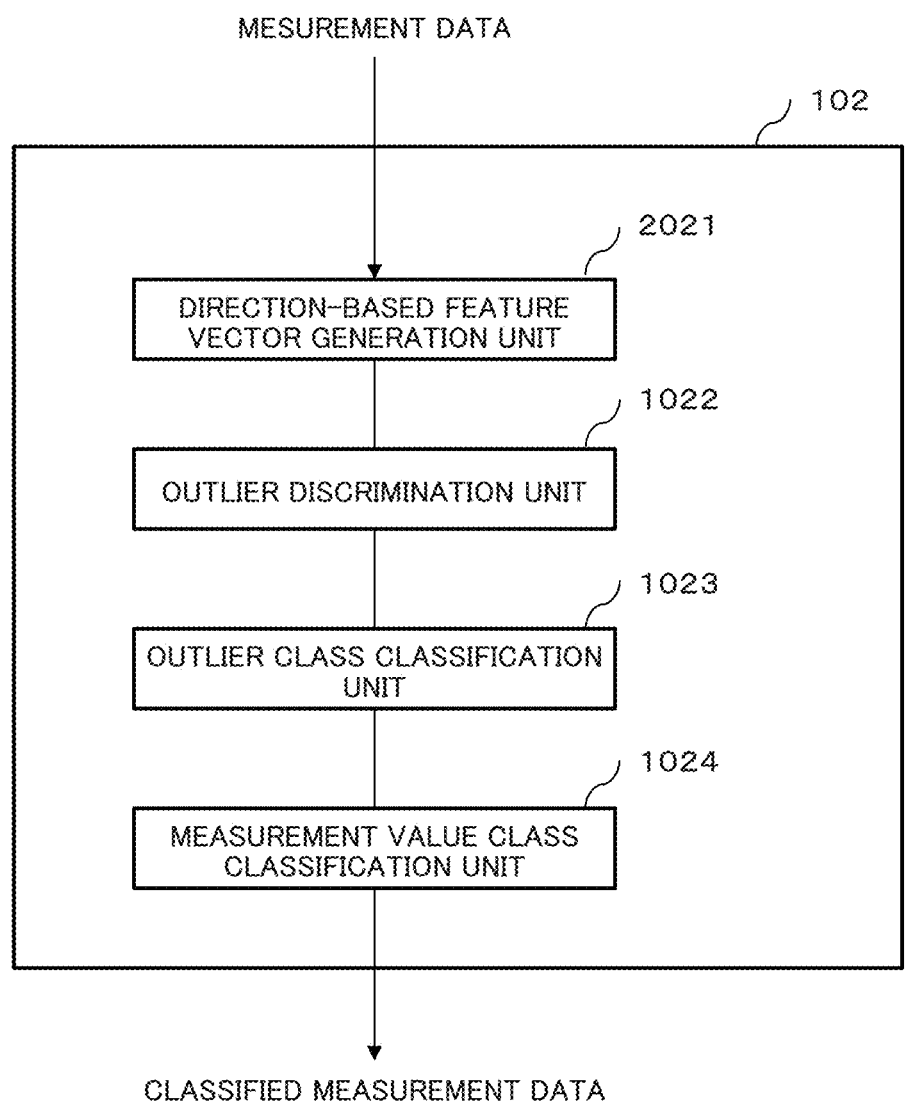
FIG. 13 is a block diagram illustrating a configuration of a class classification unit according to a third example embodiment.

FIG. 13 is a block diagram illustrating a configuration of a class classification unit of the location estimating apparatus according to the third example embodiment. The direction-based feature vector generation unit 2021 illustrated in FIG. 13 generates a feature vector for each directional section of a relative direction of a sensor pair.

For example, the relative direction of the sensor pair is the relative direction illustrated in FIG. 12 according to the second example embodiment. For example, the directional sections are acquired by dividing 0 degree to 180 degrees by every 30 degrees clockwise with a north direction from the sensor 11 as 0 degree ([0 degrees≤$\theta_1$<30 degrees], [30 degrees≤$\theta_2$<60 degrees], [60 degrees≤$\theta_3$<90 degrees], [90 degrees≤$\theta_4$<120 degrees], [120 degrees≤$\theta_5$<150 degrees], and [150 degrees≤$\theta_6$<180 degrees]: $\theta_1$ to $\theta_6$ each indicate the directional section).

When the relative direction of the sensor pair is divided into the six sections, the direction-based feature vector generation unit 2021 generates a feature vector for each directional section. For example, the feature vector is generated for each directional section, and hence the number of distribution diagrams of the feature vectors as illustrated in FIG. 7 is six. Note that, the six directional sections of the relative direction are acquired with the north direction as 0 degrees, which is not the only example. Further, the number of directional sections may be a predetermined number, and the number of directional sections for the direction-based feature vector generation unit 2021 may reflect the number of directional sections acquired by the data acquisition unit 101.

The feature vector may have, as elements, the relative distance and the degree of dissimilarity between the measurement values as described according to the first example embodiment, or may have, as elements, the relative direction and the degree of dissimilarity between the measurement values as described according to the second example embodiment. Specifically, the third example embodiment is applicable to any of the first example embodiment and the second example embodiment.

The outlier discrimination unit 1022 discriminates an outlier of the feature vector for each directional section. When there is an outlier, the outlier class classification unit 1023 classifies the measurement value of the sensor pair that gives an outlier into classes. The classification classes are, for example, a line-of-sight class and a none-line-of-sight class.

With reference to the classified measurement value that gives the outlier, the measurement value class classification unit 1024 classifies the measurement values acquired by the data acquisition unit 101 into any of the plurality of classes. The location estimation unit 103 generates a propagation model through use of the classified measurement values, and estimates a location of a transmission source through use of the generated propagation model.

Description of Advantageous Effects

With the third example embodiment, the direction-based feature vector generation unit 2021 generates the feature vector for each directional section of the relative direction, and discriminates an outlier of the feature vector for each directional section. With this, class classification associated with a relative positional relation among the transmission source, the sensors 11, and obstacles can be achieved, and the propagation model with accuracy higher than that of the first example embodiment or the second example embodiment can be generated, based on the measurement values subjected to the class classification.

For example, when the sensor 11 is located across an obstacle on the northeast side of the transmission source, and the sensor 11 is located on the southeast side of the transmission source without an obstacle, the measurement value in the direction that affects a radio wave propagation is apparent due to the directional sections. A propagation model can be generated with the measurement value in the class that is affected less by the obstacle, and estimation accuracy of the location of the transmission source can further be improved.

Fourth Example Embodiment

With reference to the drawing, a location estimating apparatus according to a fourth example embodiment is described. According to the fourth example embodiment, in a class classification unit 102 of a location estimating apparatus 10, the feature vector generation unit 1021 according to the first example embodiment is replaced with a time-space feature vector generation unit 3021.

Figure 14:
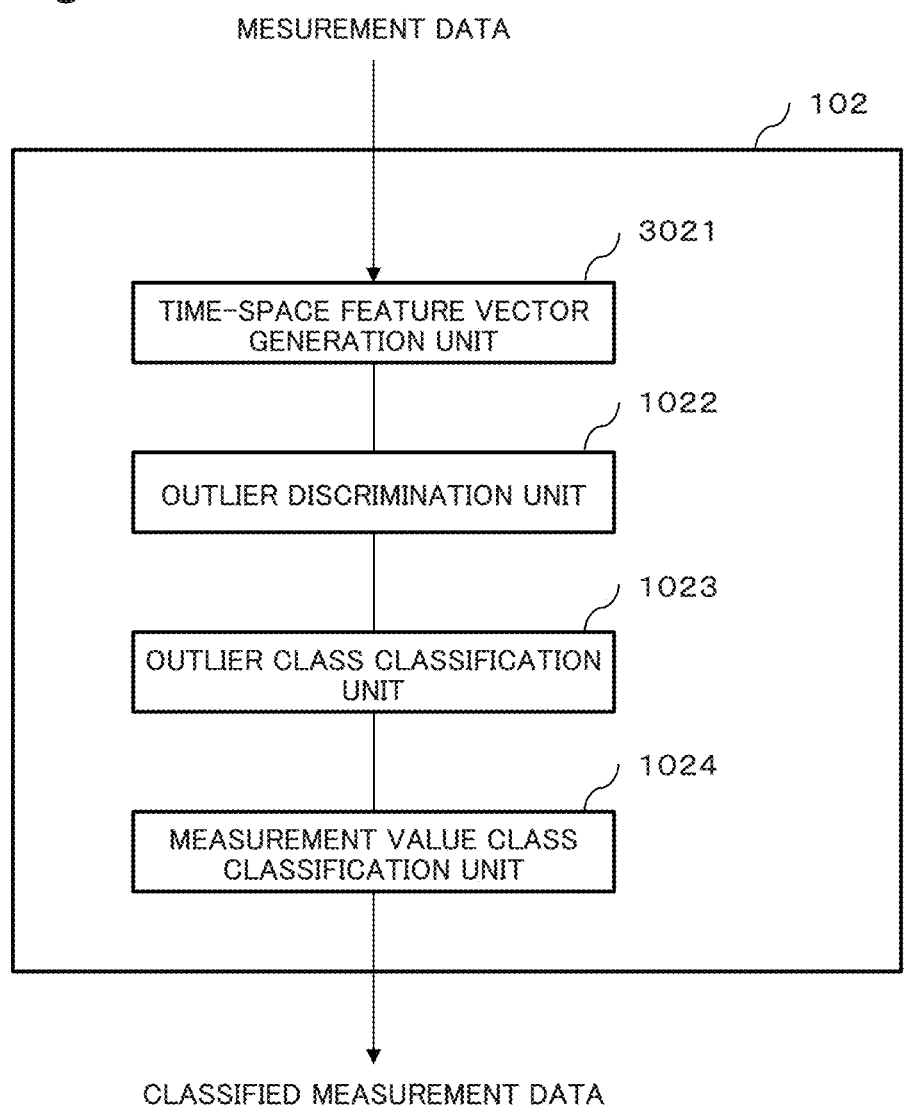
FIG. 14 is a block diagram illustrating a configuration of a class classification unit according to a fourth example embodiment.

FIG. 14 is a block diagram illustrating a configuration of a class classification unit according to the fourth example embodiment. The time-space feature vector generation unit 3021 illustrated in FIG. 14 generates a feature vector having, as elements, a difference between measurement time points of a sensor pair and a degree of dissimilarity between measurement values, in addition to the feature vector having, as elements, the relative distance of the sensor pair and the degree of dissimilarity between the measurement values.

According to the fourth example embodiment, for example, the time-space feature vector generation unit 3021 may calculate a degree of dissimilarity between measurement values for measurement values at different time points with the same sensor pair or a degree of dissimilarity between measurement values for measurement values at different time points with different two sensors.

Further, the time-space feature vector generation unit 3021 can apply the difference between the measurement time points of the sensor pair not only to the measurement values of the different sensors but also to the measurement values at the different time points with the same sensor. In this case, the time-space feature vector generation unit 3021 generates a feature vector through use of the degree of dissimilarity between the measurement values at the different time points with the same sensor as a sensor pair.

In the class classification unit 102 according to the fourth example embodiment, after the time-space feature vector generation unit 3021 generates the feature vector, an outlier discrimination unit 1022 discriminates presence or absence of an outlier of the feature vector, and when there is an outlier, an outlier class classification unit 1023 classifies measurement values that give the outlier into a plurality of classes. With reference to the measurement values that give the outlier, a measurement value class classification unit 1024 classifies measurement data including the measurement values acquired by a data acquisition unit 101 into any of the plurality of classes.

A location estimation unit 103 generates a propagation model through use of the measurement values included in the classified class, and estimates a location of a transmission source.

A difference of the measurement time points may be any of an hour, a minute, or a second. Note that, the time-space feature vector generation unit 3021 may generate the feature vector using the relative direction of the sensor pair described according to the second example embodiment.

Description of Advantageous Effects

According to the fourth example embodiment, the feature vector is generated through use of the difference of the measurement time points in addition to the relative distance and the relative direction of the sensor pair. With this, class classification of the measurement data and estimation of the propagation model depending on variation of locations of the transmission source, the sensors 11, and obstacles can be achieved. For example, even when the transmission source moves with respect to the sensors 11, the propagation model can be generated in consideration of influence of the variation of the location of the transmission source, and the location of the transmission source can be estimated with high accuracy.

Further, the degree of dissimilarity between the measurement values at the different time points of the sensor is calculated, and hence the number of feature vectors that are generated based on comparison with the same number of sensors is increased. Thus, a highly accurate analysis can be achieved statistically, resulting in greater accuracy in discrimination for the outlier of the feature vector or class classification. Further, even when the number of sensors is reduced, reduction of the number of feature vectors to be generated can be mitigated, and hence installation cost can also be lowered due to reduction of the number of sensors.

The location estimating apparatus or the location estimating system according to the example embodiments described above is applicable to a purpose of utilizing a frequency being a finite resource by estimating a location of a transmission source and a propagation range of a radio wave and using a frequency being used by the transmission source in another different region. Further, application can be made to a purpose of estimating a location of a transmission source of an illegal and unlawful radio wave and taking appropriate measures.

(Hardware Configuration)

Figure 15:
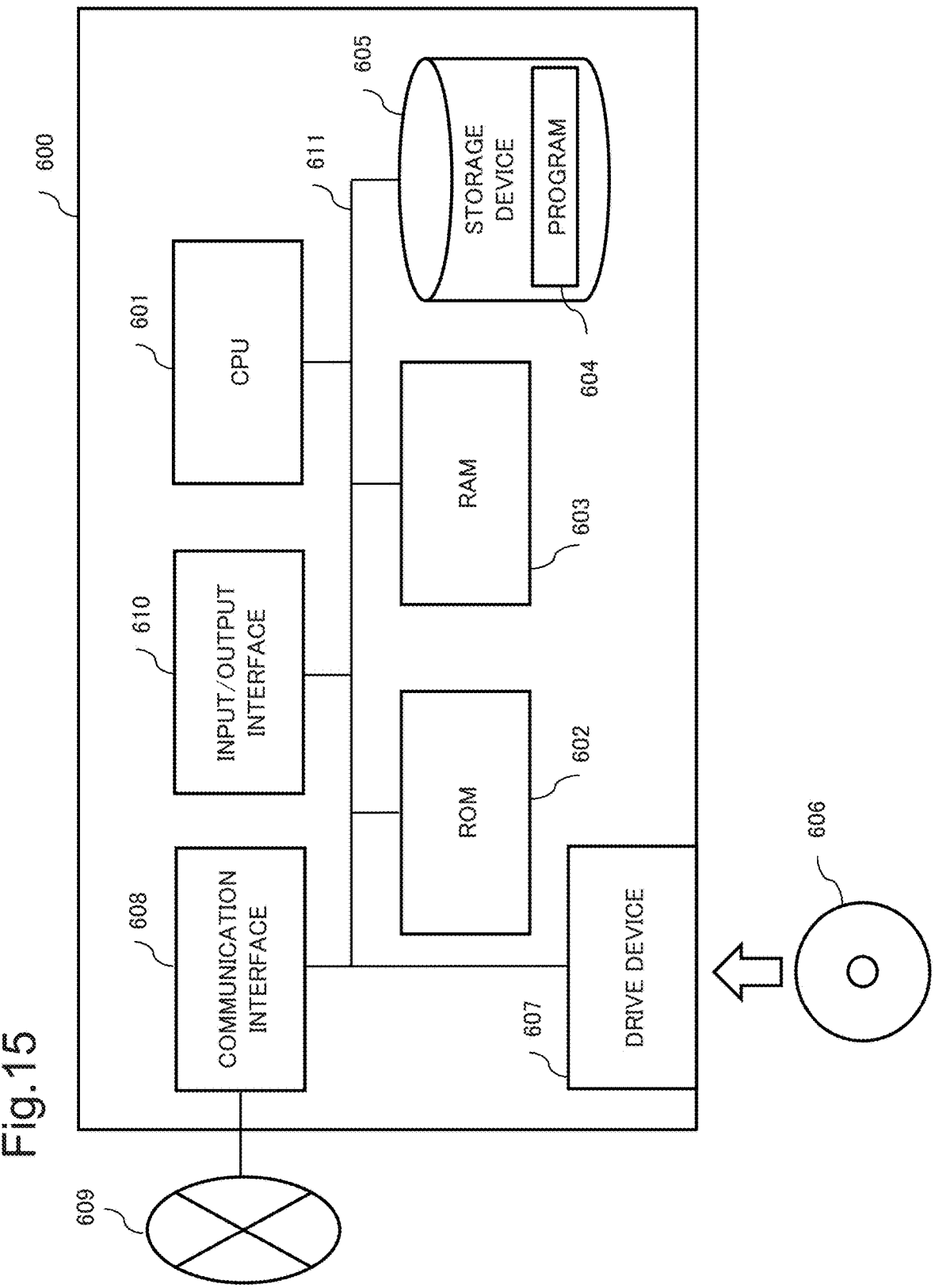
FIG. 15 is a block diagram illustrating a hardware configuration in which the location estimating apparatus and the like according to the first example embodiment to the fourth example embodiment are achieved with a computer.

FIG. 15 is a block diagram illustrating a hardware configuration in which the location estimating apparatus according to the first example embodiment to the fourth example embodiment is achieved with a computer. In each of the example embodiments, each of the constituent elements of the location estimating apparatus is indicated with a block as a function unit. A part or an entirety of each of the constituent elements of the location estimating apparatus can be achieved with, for example, a freely-selected combination of a computer 600 illustrated in FIG. 15 and a program. As one example the computer 600 includes configuration as follows:

a central processing unit (CPU) 601;
a read only memory (ROM) 602;
a random access memory (RAM) 603;
a program 604 to be loaded in the RAM 603;
a storage device 605 that stores the program 604;
a drive device 607 performing writing and reading of the recording medium 606;
a communication interface 608 to be connected to a communication network 609;
an input/output interface 610 that performs input and output of data; and
a bus 611 that connects each of the constituent elements.

Each of the constituent elements of the location estimating apparatus 10 is achieved by the CPU 601 that acquires and executes the program 604 for achieving such functions. For example, the program 604 that achieves a function of each of the constituent elements is stored in the storage device 605 or the RAM 603 in advance, and is read out by the CPU 601 as required. Note that, the program 604 may be supplied to the CPU 601 via the communication network 609, or may be stored in the recording medium 606 in advance, read out by the drive device 607, and supplied to the CPU 601.

Various modification examples can be made to the method of achieving the location estimating apparatus 10. For example, the location estimating apparatus 10 may be achieved with a freely-selected combination of a separate computer 600 and a program for each of the constituent elements. Further, the plurality of constituent elements of the location estimating apparatus 10 may be achieved with a freely-selected combination of one computer 600 and a program.

Further, a part or an entirety of each of the constituent elements of the location estimating apparatus 10 is achieved with other general-purpose or dedicated circuits, processors, and the like or a combination thereof. Those may be formed of a single chip, or may be formed of a plurality of chips to be connected via a bus. Further, in place of the computer 600, a programmable logic device such as a field-programmable gate array (FPGA) may be used.

Further, when a part or an entirety of each of the constituent elements of the location estimating apparatus 10 is achieved with a plurality of information processing devices, circuits, and the like, the plurality of information processing units, circuits, and the like may be arranged integrally or dispersedly. This is similarly applied to a universal terminal 400. For example, the information processing devices, circuits, and the like may be achieved each in a mode of being connected via a communication network such as a cloud computing system.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, orientation of the arrow in the drawings is merely one example, and is not intended to limit orientation of a signal between the blocks.

This application is based upon and claims the benefit of priority from Japanese patent application No. 2017-230799, filed on Nov. 30, 2017, the disclosure of which is incorporated herein in its entirety by reference.

REFERENCE SIGNS LIST

10 Location estimating apparatus
11 Sensor
12 Sensor control device
13 Drawing device
101 Data acquisition unit
102 Class classification unit
103 Location estimation unit
1021 Feature vector generation unit
1022 Outlier discrimination unit
1023 Outlier class classification unit
1024 Measurement value class classification unit
2021 Direction-based feature vector generation unit
3021 Time-space feature vector generation unit
601 CPU
602 ROM
603 RAM
604 Program
605 Storage device
606 Recording medium
607 Drive device
608 Communication interface
609 Communication network
610 Input/output interface
611 Bus

The invention claimed is:

1. A location estimating apparatus, comprising:
a data acquisition unit configured to acquire measurement values of sensors that measure a radio wave from a transmission source, and location information of the sensors;
a class classification unit configured to classify the acquired measurement values into classes through use of a relative location and a degree of dissimilarity between the measurement values for each pair of the sensors; and
a location estimation unit configured to estimate a location of the transmission source, based on the classified measurement values and the location information of the sensors, wherein
the relative location is a relative distance or a relative direction, and
the class classification unit includes:
a feature vector generation unit configured to generate a feature vector having, as elements, the relative location and the degree of dissimilarity for each pair of the sensors;
an outlier discrimination unit configured to discriminate presence or absence of an outlier of the feature vector;
an outlier class classification unit configured to, when there is the outlier, classify measurement values that give the outlier into classes with respect to a pair of the measurement values that give the outlier, based on a magnitude relationship between elements of the pair of the measurement values; and
a measurement value class classification unit configured to classify the acquired measurement values into classes, based on a degree of similarity between each of the acquired measurement values and the classified measurement values that give the outlier.

2. The location estimating apparatus according to claim 1, wherein
the outlier class classification unit classifies measurement values that give the outlier into classes in such a way that, among a pair of measurement values that give the outlier, a larger value is in a line-of-sight class and a smaller value is in a none-line-of-sight class.

3. The location estimating apparatus according to claim 1, wherein
the feature vector generation unit generates the feature vector for each directional section indicating a relative direction of the pair of sensors,
the outlier discrimination unit discriminates presence or absence of the outlier of the feature vector for the each directional section,
the outlier class classification unit classifies measurement values that give the outlier into classes for the each directional section, and
the measurement value class classification unit classifies, when there is the outlier for the each directional section, the acquired measurement values into classes with respect to a pair of the measurement values that give the outlier, through use of the degree of similarity between each of the acquired measurement values and the classified measurement values that give the outlier, based on the magnitude relationship between elements of the pair of measurement values.

4. The location estimating apparatus according to claim 2, wherein
the feature vector generation unit generates the feature vector for each directional section indicating a relative direction of the pair of sensors,
the outlier discrimination unit discriminates presence or absence of the outlier of the feature vector for the each directional section,
the outlier class classification unit classifies measurement values that give the outlier into classes for the each directional section, and
the measurement value class classification unit classifies, when there is the outlier for the each directional section, the acquired measurement values into classes with respect to a pair of the measurement values that give the outlier, through use of the degree of similarity between each of the acquired measurement values and the classified measurement values that give the outlier, based on the magnitude relationship between elements of the pair of measurement values.

5. The location estimating apparatus according to claim 1, wherein
the class classification unit classifies the acquired measurement values into classes through use of the relative location and a degree of dissimilarity between the measurement values, and a measurement time difference and the degree of dissimilarity between the measurement values for each pair of the sensors.

6. The location estimating apparatus according to claim 2, wherein
the class classification unit classifies the acquired measurement values into classes through use of the relative location and a degree of dissimilarity between the measurement values, and a measurement time difference and the degree of dissimilarity between the measurement values for each pair of the sensors.

7. The location estimating apparatus according to claim 3, wherein
the class classification unit classifies the acquired measurement values into classes through use of the relative location and a degree of dissimilarity between the measurement values, and a measurement time difference and the degree of dissimilarity between the measurement values for each pair of the sensors.

8. The location estimating apparatus according to claim 5, wherein
the pair of sensors is a pair of same sensors.

9. The location estimating apparatus according to claim 6, wherein
the pair of sensors is a pair of same sensors.

10. The location estimating apparatus according to claim 7, wherein
the pair of sensors is a pair of same sensors.

11. A location estimating system, comprising:
a plurality of sensors configured to measure a radio wave from the transmission source; and
the location estimating apparatus according to claim 1.

12. A location estimating system, comprising:
a plurality of sensors configured to measure a radio wave from the transmission source; and
the location estimating apparatus according to claim 2.

13. A location estimating system, comprising:
a plurality of sensors configured to measure a radio wave from the transmission source; and
the location estimating apparatus according to claim 3.

14. A location estimating apparatus, comprising:
a data acquisition unit configured to acquire measurement values of sensors that measure a radio wave from a transmission source, and location information of the sensors;
a class classification unit configured to classify the acquired measurement values into classes through use of a relative location and a degree of dissimilarity between the measurement values for each pair of the sensors; and
a location estimation unit configured to estimate a location of the transmission source, based on the classified measurement values and the location information of the sensors, wherein
the class classification unit classifies the acquired measurement values into classes through use of the relative location and a degree of dissimilarity between the measurement values, and a measurement time difference and the degree of dissimilarity between the measurement values for each pair of the sensors.

15. A location estimating system, comprising:
a plurality of sensors configured to measure a radio wave from the transmission source; and
the location estimating apparatus according to claim 14.

16. The location estimating apparatus according to claim 14, wherein
the pair of sensors is a pair of same sensors.

17. A location estimating method, comprising:
acquiring measurement values of sensors that measure a radio wave from a transmission source and location information of the sensors;
generating a feature vector having, as elements, the relative location and the degree of dissimilarity for each pair of the sensors;
discriminating presence or absence of an outlier of the feature vector;
classifying measurement values that give the outlier into classes with respect to a pair of the measurement values that give the outlier, based on a magnitude relationship between elements of the pair of the measurement values, when there is the outlier;
classifying the acquired measurement values into classes, based on a degree of similarity between each of the acquired measurement values and the classified measurement values that give the outlier; and
estimating a location of the transmission source, based on the classified measurement values and the location information of the sensors, wherein
the relative location is a relative distance or a relative direction.

18. A non-volatile recording medium configured to store a program, the program causing a computer to execute:
acquiring measurement values of sensors that measure a radio wave from a transmission source and location information of the sensors;
generating a feature vector having, as elements, the relative location and the degree of dissimilarity for each pair of the sensors;
discriminating presence or absence of an outlier of the feature vector;
classifying measurement values that give the outlier into classes with respect to a pair of the measurement values that give the outlier, based on a magnitude relationship between elements of the pair of the measurement values, when there is the outlier;
classifying the acquired measurement values into classes, based on a degree of similarity between each of the acquired measurement values and the classified measurement values that give the outlier; and estimating a location of the transmission source, based on the classified measurement values and the location information of the sensors, wherein
the relative location is a relative distance or a relative direction.

19. A location estimating method, comprising:

acquiring measurement values of sensors that measure a radio wave from a transmission source and location information of the sensors;

classifying the acquired measurement values into classes through use of a relative location and a degree of dissimilarity between the measurement values for each pair of the sensors and a measurement time difference and the degree of dissimilarity between the measurement values for each pair of the sensors; and estimating a location of the transmission source, based on the classified measurement values and the location information of the sensors.

20. A non-volatile recording medium configured to store a program, the program causing a computer to execute:

acquiring measurement values of sensors that measure a radio wave from a transmission source and location information of the sensors;

classifying the acquired measurement values into classes through use of a relative location and a degree of dissimilarity between the measurement values for each pair of the sensors and a measurement time difference and the degree of dissimilarity between the measurement values for each pair of the sensors; and estimating a location of the transmission source, based on the classified measurement values and the location information of the sensors.

* * * * *